United States Patent [19]

Westbrook et al.

[11] Patent Number: 5,038,000
[45] Date of Patent: Aug. 6, 1991

[54] WALL MOUNTING SYSTEM FOR DATA COMMUNICATION CONNECTORS

[76] Inventors: Robert R. Westbrook, 418 Somerville Road, Hornsby Height, N.S.W. 2077; Malcolm M. Wilson, 39 Gerrish Street, Gladesville, N.S.W. 2111, both of Australia

[21] Appl. No.: 258,997
[22] PCT Filed: Nov. 27, 1987
[86] PCT No.: PCT/AU87/00404
§ 371 Date: Jun. 10, 1988
§ 102(e) Date: Jun. 10, 1988
[87] PCT Pub. No.: WO88/04112
PCT Pub. Date: Jun. 2, 1988

[30] Foreign Application Priority Data

Nov. 28, 1986 [AU] Australia ............................ PH09213

[51] Int. Cl.⁵ ................................................ H02G 3/18
[52] U.S. Cl. ..................................... 174/52.1; 174/65 R
[58] Field of Search ............... 174/52.1, 65 R; 439/76, 439/687, 689, 695, 696, 701, 465, 906

[56] References Cited

U.S. PATENT DOCUMENTS

| | | | |
|---|---|---|---|
| 3,873,889 | 3/1975 | Leyba | 174/52.1 X |
| 3,999,830 | 12/1976 | Herrmann, Jr. | 439/906 X |
| 4,210,380 | 7/1980 | Brzostek | 439/465 |
| 4,575,174 | 3/1986 | Leeds et al. | 439/465 |

Primary Examiner—Leo P. Picard
Assistant Examiner—David A. Tone
Attorney, Agent, or Firm—Bryan, Cave, McPheeters & McRoberts

[57] ABSTRACT

A mounting system for data communications connectors comprising a body portion, formed as a substantially rectangular frame (1) defining a central void; the frame having a depth not less than the depth of a flange of a standard 25 pin D type connector; at least one end of the frame, when viewed in elevation, displaying a wide substantially "U" shaped cut-out (7) open to the upper surface of the frame; guide channels (8) on each of the two opposing sides of the "U" shaped cut-out adapted to releasably receive and guide a peripheral portion (12) of an adaptor plate (11) slidably introduced from the open end of the "U" shaped cut-out, the guide channel serving to locate the flange of the adaptor plate so as to fill in the "U" shaped cut-out whilst preventing movement with respect to the frame perpendicular to the direction along which the adaptor plate has been slidably introduced the frame, a cover plate (19) for the upper surface of the frame such cover plate extending at least in part over an area above the guide channels such that once the flange of an adaptor plate is introduced into the frame and the cover plate is in place the adaptor plate is captive within the frame/cover plate system; the adaptor plate (11) including a recess (15) into which the flange (13) of a connector may be introduced in order that a connector may be captivated between the adaptor plate and one side of channel (8).

6 Claims, 2 Drawing Sheets

WALL MOUNTING SYSTEM FOR DATA COMMUNICATION CONNECTORS

The present invention relates to connectors and in particular to a wall mounting system for data communications connectors.

The proliferation of data processing and communication devices over recent years has necessitated the installation of extensive wiring in buildings housing users for such equipment. Typically a central processing unit may be located in one position on one floor of a large building whereas persons using information from the unit or keying in information to the unit may be located on another floor of the building or at a position on the same floor somewhat removed from the unit. The various components comprising a data communication system are traditionally linked by complex wiring systems and in order to facilitate the servicing of independent components of such systems and to maintain the versatility of such a system a number types of connectors are used to plug one component of the system into wiring in communication with other components of the system.

Typically the wiring for such systems may be concealed within walls, within skirting boards or even surface-mounted on a wall, ceiling or floor. Typically cover plates of the type used in relation to conventional electric plug points and light switches are utilised to locate one-half of a male/female plug system; the other half of the system being a "flying" lead.

Such cover plates are not entirely adequate for a number of reasons the first being that they result in a connector protruding from the wall or mounting surface with the wiring at ninety degrees from the wall. Such a system is wasteful of space and exposes the connectors to damage by cleaning equipment or other movement adjacent the cover plate.

It is additionally the case that a number of different types of connectors are used in relation to data communication equipment ranging from BNC type co-axial connectors to 5, 9, 15 or 25 pin D type connectors.

Conventional "plug point" type cover plates are provided with a number of different shape cut-outs to accommodate such differing connectors. Such cover plates are additionally provided with hardware in the nature of threaded "hex posts" in order to fix the peripheral flanges of female connectors to the peripheral flanges of corresponding male connectors in a satisfactory spaced relationship such that the male and female plugs may be securely, although removably united. Such hardware is expensive as it does not form part of the plastic cover plates and it is furthermore expensive to provide cover plates having differing cut-outs to suit differing connectors.

The present invention seeks to ameliorate one or more of the abovementioned disadvantages with existing data communications mounting plates or at least to provide the consumer with a choice.

According to the present invention there is provided a mounting system for data communications connectors comprising a body portion formed as a substantially rectangular frame defining a central void; the frame having a depth not less than the depth of a flange of a standard 25 pin D type connector; at least one end of a frame, when viewed in elevation, displaying a wide substantially U-shaped cut-out open to the upper surface of the frame; guide means on each of the two opposing sides of the U-shaped cut-adapted to releasably receive and guide the flange of a connector or a peripheral portion of an adaptor plate slidably introduced from the open end of the U-shaped cut-out, the guide means serving to locate the flange of the connector or the adaptor plate so as to fill in the "U" shaped cut-out while preventing movement with respect to the frame perpendicular to the direction along which such articles are slidably introduced into the frame; a cover plate for the upper surface of the frame such cover plate extending at least in part over an area above the guide means such that once the flange of a connector or an adaptor plate is introduced into the frame and the cover plate is in place the connector or adaptor plate is captive within the frame/cover plate system; means to facilitate fixing of the frame to a fixed surface and means for securing the cover plate to the frame.

One embodiment of the present invention will now be described with reference to the accompanying drawings in which.

Figure 1:
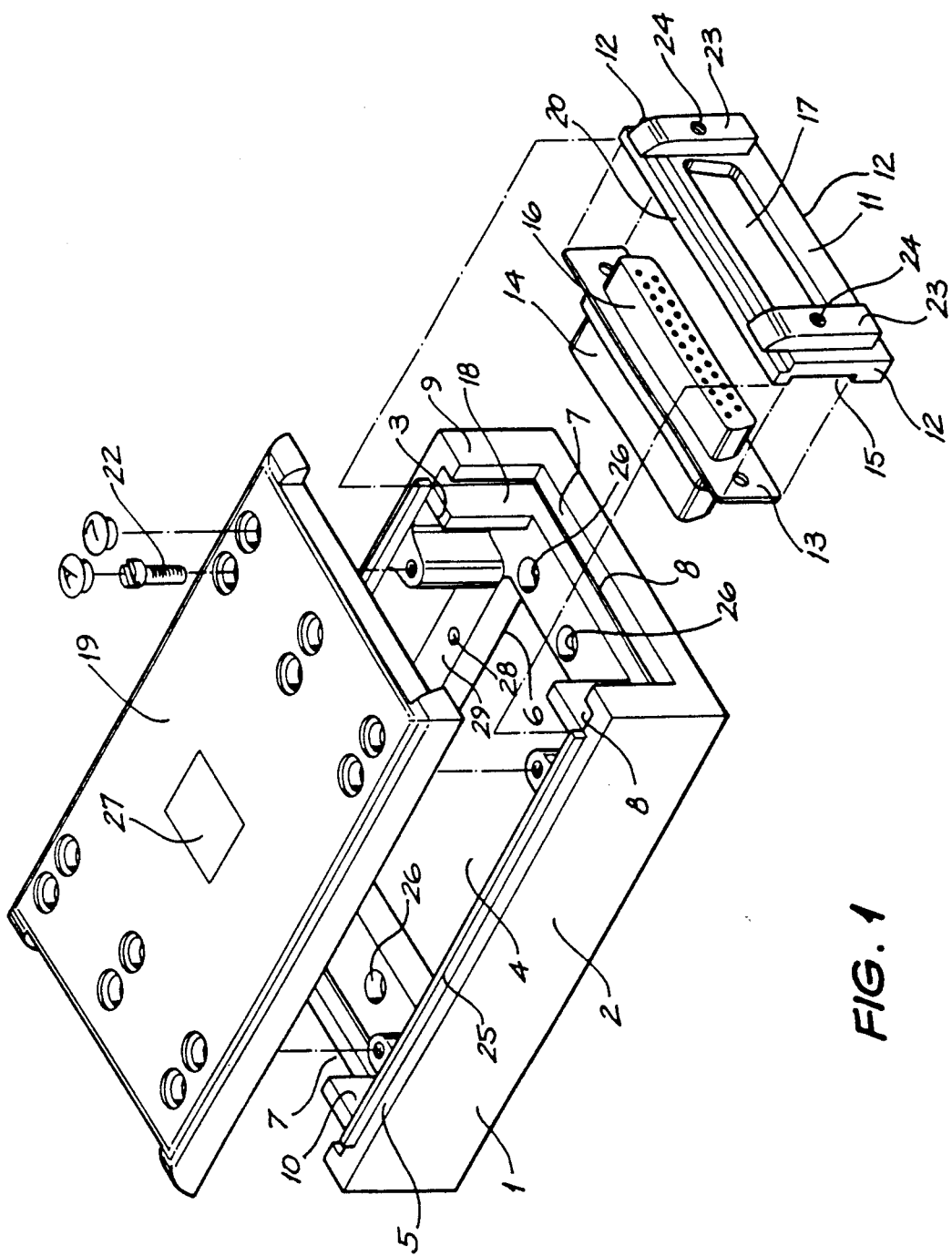
FIG. 1 is a perspective view of a mounting system in accordance with the present invention in exploded form.

FIG. 1 depicts in exploded form a wall mounting system in accordance with the present invention comprising a rectangular body portion (1) being in the nature of a rectangular frame having upstanding side portions (2) and (3) defining a large central void (4) with the upper surface of the frame (comprising the upper edges (5) of upstanding sides (2) and (3)) defining a large opening to the top; there being a similar large opening (6) at the bottom of the frame.

The embodiment of FIG. 1 incorporates to wide "U" shaped cut-outs (7), one in either end of the frame.

Each of these "U" shaped cut-outs are provided with peripheral channels (8) let into the end walls of the frame between the external surface (9) of the end of the frame and the internal surface (10) of the end of the frame.

These peripheral channels (8) are dimensioned so as to receive adaptor plate (11) when such adaptor plate is introduced into a peripheral channel from the upper surface of the frame and urged downward so that the three sides (12) of the adaptor plate are secured from longitudinal movement with respect to the frame by the peripheral channel (8).

It will be noted that if the flange (13) of the standard 25 pin D type connector (14) is placed within recess (15) with the main body (16) of the connector protruding through appropriately shaped cut-out (17) in adaptor plate (11) and the combined adaptor plate/connector is then slidably introduced into channel (8) then the connector will be restrained and located as regards longitudinal movement with respect to the frame by reason of it being sandwiched between the recess (15) in the adaptor plate (11) and the innermost wall (18) of the channel (8). It is for this reason that the innermost wall (18) of the channel should extend into the "U" shaped cut-out to an extend that the width of the two opposing sides of the "U" shaped cut-out is not greater than that of flange (13).

Figure 2:
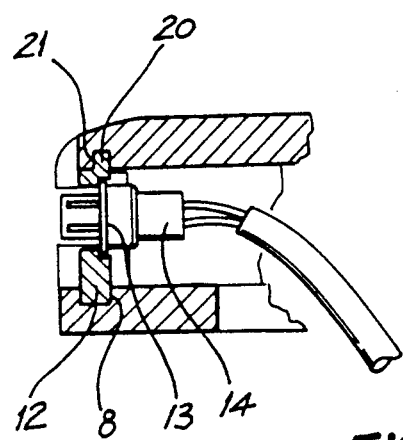
FIG. 2 is a bottom plan view of the cover plate depicted in FIG. 1.
Figure 3:
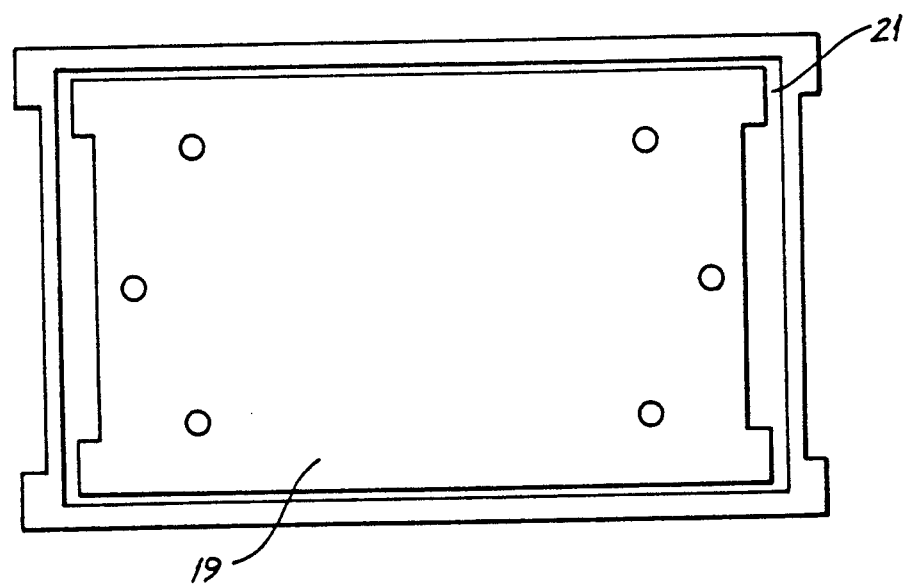
FIG. 3 is a longitudinal vertical section through the mounting system of FIG. 1 in assembled form.

It will be noted that when cover plate (19) is in place it covers the top (20) of adaptor plate (11) and indeed as may best be seen from FIGS. 2 and 3 the bottom of cover plate (19) is provided with a recessed channel (21)

intended to accommodate the upper surface (20) of adaptor plate (11) in order that the adaptor plate may be positively secured within the end of the frame along all four sides. The cover plate (19), when secured in place by means of screws (22) will furthermore ensure that adaptor plate (11) and hence connector (14) may not become dislodged from the mounting system as a whole.

It should be noted that spacer portions (23) on adaptor plate (11) together with the location of channels (8) ensure that the connector (16) does not protrude beyond the mounting system in the assembled form and is therefore not exposed to damage. This might best be seen from FIG. 3. These spacers additionally ensure that the flange of the connector (not shown) which mates with connector (14) may sit hard against the outer surface of spacers (23). Spacer portions (23) are provided with tapped apertures (24) in order that a flange of a mating connector (not shown) may be positively secured thereto and consequently in communication with connector (14).

This embodiment encorporates a feature whereby channel (21) extends all the way around the underside of cover plate (19) and the frame (1) is provided with a corresponding tongue (25) intended to mate with such channel. This feature improves the dust sealing of the system as well as providing positive location for the cover plate and assisting in splash protection for wiring contained within the system.

In use predrilled apertures (26) facilitate mounting of the frame to a wall and wiring may readily pass from inside the wall into the void formed in the frame distribution to the rear of connector (14) or other connectors associated with the system. It should be appreciated that one of the upstanding side walls of the frame may include a knock-out panel (not shown) in order that wiring may be introduced from the side of the frame in the case where wiring does not run through a wall but is run along the surface of a wall. It will be appreciated that the depicted embodiment may accommodate two 25 pin D shaped connectors one in either end of the frame although one or indeed both ends may be "blanked off" by the use of a "blank" adaptor plate (not shown) intended to slide into channel (8) thereby sealing the unit. It should further be appreciated that alternate adaptor plates are contemplated apart from that depicted in order to accommodate connectors other than 25 pin D type connectors. One of the advantages of the present type of system is that the adaptor plates are relatively small mouldings and consequently the manufacture and stocking of large numbers of a number of styles of such adaptor plates is not unduly expensive or inconvenient particularly as the main components of the system being the frame (1) and the cover plate (19) are common to the system no matter what type of connector is being utilised.

It will be noted that cover plate (19) may be provided with a cut-out such as that depicted as (27) in order to facilitate use of the system in relation to additional connectors such as telephone jacks as the void (4) incorporates considerably space for the inclusion of further connectors and wiring. Indeed void (4) may additionally accommodate small printed circuits (not shown) and to this end additional fixing points (28) are provided on ledge (29) at the bottom of the frame to facilitate fixing of printed circuit boards.

It should be appreciated that adaptor plates such as that depicted as (11) may accommodate a wide variety of connectors apart from 25 pin D shaped connectors and indeed the system may be adapted for co-axial type connectors or D type connectors having a lesser number of pins.

The claims defining the invention are as follows:

We claim:

1. A mounting system for communications connectors comprising a body portion formed as a substantially rectangular frame defining a central void; the frame having a depth not less than the depth of a flange of a standard 25 pin D type connector; at least one end of the frame, when viewed in elevation displaying a wide substantially "U" shaped cut-out open to the upper surface of the frame; guide means on each of the two opposing sides of the "U" shaped cut-out adapted to releasably receive and guide the flange of a connector or a peripheral portion of an adaptor plate slidably introduced from the open end of the "U" shaped cut-out, the guide means serving to locate the flange of the connector or the adaptor plate so as to fill in the "U" shaped cut-out while preventing movement with respect to the frame perpendicular to the direction along which such articles are slidably introduced into the frame; a cover plate for the upper surface of the frame, such cover plate extending at least in part over an area above the guide means such that once the flange of a connector or an adaptor plate is introduced into the frame and the cover plate is in plate the connector or adaptor plate is captive within the frame/cover plate system; means to facilitate fixing of the frame to a fixed surface; and means for securing the cover plate to the frame and an adaptor plate with an aperture therein sufficiently large for passing the body of a given type of connector but not so large as to pass the flange surrounding such connector; a recess in the back of the adaptor plate adequate to accommodate the flange of said given type of connector, an innermost surface of the guide means extending into the area of the "U" shaped cut-out to such an extent that in use the sliding of the adaptor plate, with the connector countersunk therein, into the guide means results in the sandwiching of at least part of the flange of the connector between said innermost wall of the guide means and the recess in the back of the adaptor plate thereby captivating the connector with respect to the adaptor plate and furthermore with respect to the frame having regard to the fact that the adaptor plate is in turn captivated within the guide means formed in the frame.

2. A mounting system in accordance with claim 1 wherein the guide means is a peripheral channel extending around the periphery of the "U" shaped cut-out and formed between the internal and external surfaces of the end of the frame containing the "U" shaped cut-out, the channel being open to the top of the "U" shaped cut-out; at least part of the lower surface of the cover plate which overlies the open end of the "U" shaped cut-out being provided with a channel being co-planar with the peripheral channel in the "U" shaped cut-out such that when the cover plate is in place on the frame the flange of the connector and the adaptor plate will be supported and restrained from movement on all four sides by said peripheral channels.

3. A mounting system in accordance with claim 1 wherein there are blank adaptor plates formed so as to be inserted into and captivated by, the guide means thereby closing off the "U" shaped cut-outs in the end of the frame.

4. A mounted system in accordance with claim 1 wherein cut-outs are provided in the cover plate to facilitate introduction of further connectors.

5. A mounting system in accordance with claim 1 wherein the central void within the frame includes a surface adapted to mount a printed circuit board.

6. A mounting system for communications connectors comprising a body portion formed as a substantially rectangular frame defining a central void; the frame having a depth not less than the depth of a flange of a standard 25 pin D type connector; at least one end of the frame, when viewed in elevation displaying a wide substantially "U" shaped cut-out open to the upper surface of the frame; guide means on each of the two opposing sides of the "U" shaped cut-out adapted to releasably receive and guide the flange of a connector or a peripheral portion of an adaptor plate slidably introduced from the open end of the "U" shaped cut-out, the guide means serving to locate the flange of the connector or the adaptor plate so as to fill in the "U" shaped cut-out while preventing movement with respect to the frame perpendicular to the direction along which such articles are slidably introduced into the frame; a cover plate for the upper surface of the frame, such cover plate extending at least in part over an area above the guide means such that once the flange of a connector or an adaptor plate is introduced into the frame and the cover plate is in place the connector or adaptor plate is captive within the frame/cover plate system; means to facilitate fixing of the frame to a fixed surface and wherein the cover plate is provided with peripheral grooves and the upper surface of at least two upstanding sides of the frame are provided with continuous tongues adapted to cooperate with such grooves in the cover plate so as to form a dust seal when the two parts are in the assembled form.

* * * * *